INVENTOR.
ARTHUR J. SCHULTZ
BY Williams and Kreske
ATTORNEYS

United States Patent Office 3,453,770
Patented July 8, 1969

1

3,453,770
FISHING LURE HOLDERS
Arthur J. Schultz, 534 Cohasset Drive,
Sharon, Pa. 16146
Filed May 12, 1967, Ser. No. 637,999
Int. Cl. A01k 97/06
U.S. Cl. 43—57.5                    2 Claims

ABSTRACT OF THE DISCLOSURE

A structurally integral device providing a relative thick body of flexible material with opposed faces in which fishing lures may be embedded. Relatively thin rigid covers overlie respective body faces and bear against the lures to embed them into the body. A latch is provided for releasably retaining the covers in normal position and the covers are shiftable to expose the body faces for removal or replacement of lures.

---

While there are many prior art holders for fishing lures, none have been entirely satisfactory. Of those devices which securely retain the lures against damage and entanglement with each other, the lures are not readily accessible. In devices where the lures are readily accessible, they are not securely held and they are easily lost or entangled with each other.

The present invention provides a holder which securely retains fishing lures against damage and entanglement while they are readily accessible for use. The instant holder is simple and can be manufactured and sold at low cost. These and other advantages will readily become apparent from a study of the following description and from the drawing appended hereto.

In the drawing accompanying this specification and forming a part of this application there is shown, for purpose of illustration, an embodiment which the invention may assume, and in this drawing.

Figure 1:
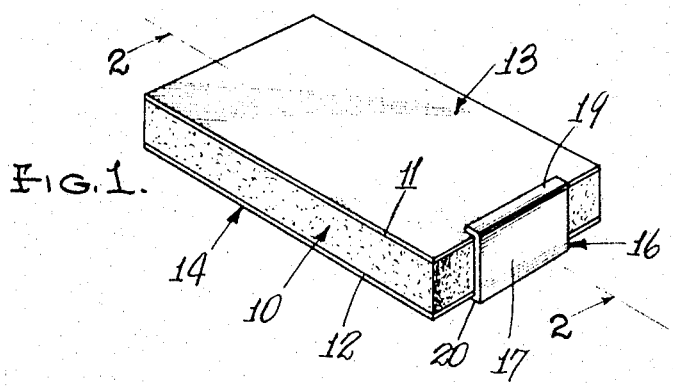
FIGURE 1 is a perspective view of a fishing lure holder constructed in accordance with the present invention.
Figure 2:
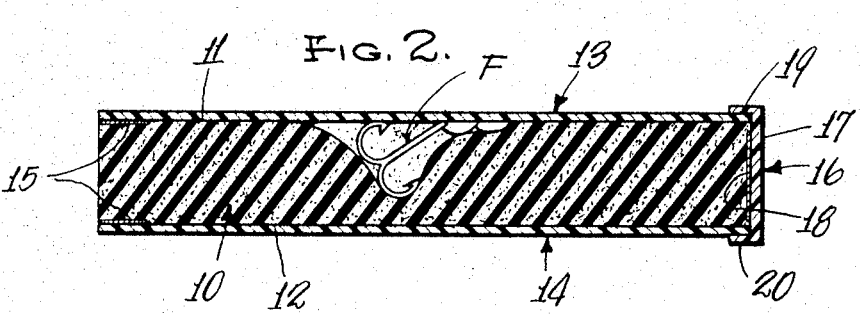
FIGURE 2 is an enlarged, sectional view generally corresponding to the line 2—2 of FIGURE 1.

With reference to FIGURES 1 and 2, the preferred embodiment of the invention herein disclosed comprises a relatively thick block 10, or body, of flexible material. A suitable material has been found to be sponge material, preferably of the synthetic type. The thickness of the body 10 should be at least equal to, and preferably somewhat greater than, the maximum transverse size of the largest lure which is to be stored in the holder.

Overlying opposed body faces 11 and 12 are respective covers 13 and 14 of a thin, rigid material such as sheet metal or resin impregnated fiberboard. The latter material is preferred since it is soft enough to not blunt the points of the lure hooks. Covers 13, 14 are adapted to be pivotally secured to the body 10 for flatwise movement relative thereto in the following manner: As seen in FIGURE 2, adjoining margins of respective covers are secured to respective body surfaces 11, 12 by a cement bond 15. At the opposite end of the body 10, a channel-shaped latch member 16 has its web portion 17 cemented

2 at 18 to the adjoining body edge and has its flange portions 19, 20 overlying respective adjoining covers 13, 14.

Figure 3:
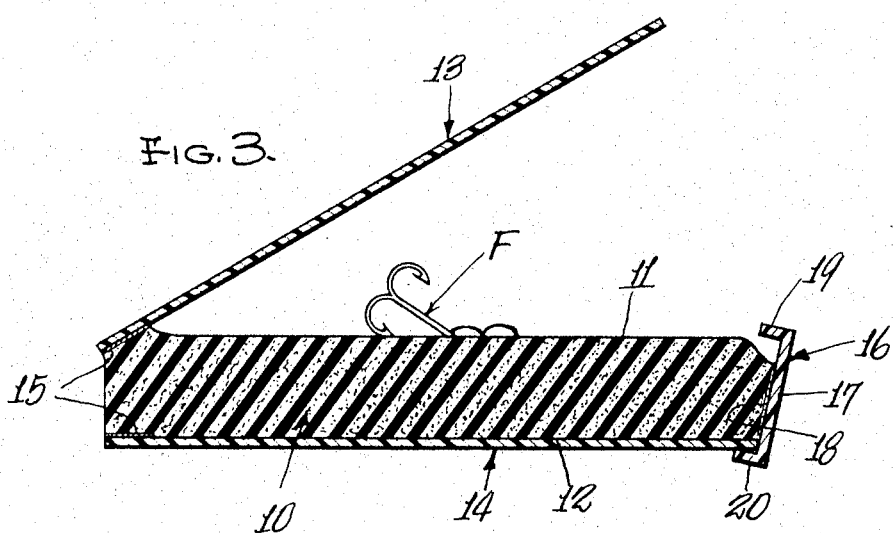
FIGURE 3 is a view similar to FIGURE 2 but showing the holder opened to accept a fishing lure to be stored therein or to permit removal of a stored lure therefrom.

When a fishing lure is to be stored in the holder, the latch member 16 will be tilted to the position seen in FIGURE 3 to disengage its flange 19 from the cover 13 whereupon the latter may be shifted to the position illustrated to expose the body face 11. One or more fishing lures F may then be disposed upon the body face 11 and the cover returned to its previous position seen in FIGURE 2 thus embedding the lure or lures F in the body 10.

It is to be understood that the flexibility of the body 10 is such that the latch member 16 may readily be tilted to the position seen in FIGURE 3 and the cover 13 pivoted as therein seen. Moreover, the resiliency of the body will tend to return the cover and the latch member to the positions seen in FIGURE 2. While only one lure F has been shown in FIGURES 2 and 3, it is to be understood that a number of lures may be interposed between the cover 13 and the body 10. Additionally, while lures have not been shown between the cover 14 and the body, they may be interposed therebetween in the same manner as above described with respect to cover 13.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:
1. A holder for fishing lures and the like comprising a relatively thick body of flexible material having opposed faces in which a lure may be embedded without damage,
   a relatively thin, rigid cover normally overlying each body face aforesaid and respective covers being adapted to bear against a fishing lure interposed between itself and its adjoining body face to embed and retain said lure in such body face,
   adjoining marginal portions of respective covers being cemented to said body and flexibility of the latter providing for swinging movement of said covers in a flatwise direction away from adjoining body faces to expose the latter for disposition of a lure thereagainst or removal of a lure therefrom,
   and latch means carried by said body and releasably engaged with marginal portions of respective covers to releaseably retain the latter against respective body faces.
2. The construction of claim 1 wherein said latch means comprises a channel-shaped member having its web portion cemented to said body and its flange portions normally overlying respective opposite cover marginal portions aforesaid and wherein flexibility of said body provides for tilting of said member away from its normal, cover-engaging and latching position.

References Cited

UNITED STATES PATENTS

| | | | |
|---|---|---|---|
| 206,206 | 7/1878 | Yerrinton | 43—57.5 |
| 3,199,243 | 8/1965 | Caston | 43—57.5 X |

HUGH R. CHAMBLEE, *Primary Examiner.*